US011041313B2

(12) United States Patent
Oelkers et al.

(10) Patent No.: US 11,041,313 B2
(45) Date of Patent: Jun. 22, 2021

(54) ROOFING THERMAL WELDER EXTENSION MARKING TOOL

(71) Applicant: CARLISLE CONSTRUCTION MATERIALS, LLC, Carlisle, PA (US)

(72) Inventors: Trent Oelkers, Carlisle, PA (US); James Gage, Boiling Springs, PA (US); Jesse Sutton, Carlisle, PA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 0 days.

(21) Appl. No.: 16/782,800

(22) Filed: Feb. 5, 2020

(65) Prior Publication Data

US 2020/0256058 A1    Aug. 13, 2020

Related U.S. Application Data

(60) Provisional application No. 62/803,177, filed on Feb. 8, 2019.

(51) Int. Cl.
*E04D 5/14* (2006.01)
*B29C 65/02* (2006.01)
(Continued)

(52) U.S. Cl.
CPC ............. *E04D 5/149* (2013.01); *B29C 65/02* (2013.01); *B29C 66/1122* (2013.01); *B29C 66/306* (2013.01); *B29C 66/43* (2013.01); *B29C 66/86521* (2013.01); *B29C 66/86523* (2013.01); *B29K 2701/12* (2013.01);
(Continued)

(58) Field of Classification Search
CPC ............... E04D 5/149; Y10T 156/1348; Y10T 156/1788; Y10T 156/1715; B29C 66/1122; B29C 66/865–86535; B29C 66/43; B29C 66/306
See application file for complete search history.

(56) References Cited

U.S. PATENT DOCUMENTS 2,936,470 A   5/1960  Meeds
6,537,402 B2  3/2003  Pate et al.
(Continued)

OTHER PUBLICATIONS

International Searching Authority, International Search Report and Written Opinion for corresponding International Application No. PCT/US2020/016821, dated Apr. 22, 2020, 10 pages.

*Primary Examiner* — Carson Gross
(74) *Attorney, Agent, or Firm* — David R. Heckadon; Gordon Rees Scully; Mansukhani LLP

(57) ABSTRACT

A thermal welding marking system for attachment to a thermal welding machine including: a hammer arm rotatably connected to a mounting bracket attached to the thermal welding machine, wherein a distal end of the hammer arm is shaped to receive a marker or pen therein; a cable or spring connected to the distal end of the hammer arm; a cable connecting the hammer arm to a hand lever mounted adjacent to hand controls on the thermal welding machine, wherein movement of the hand lever raises or lowers the distal end of the hammer arm and thereby raises or lowers the marker or pen therein. In operation, the thermal welding machine is advanced across the edges of overlapping building roofing material and the marker or pen is intermittently lowered/raised to mark locations along a seam of the edges of overlapping building roofing material where the seam is either open or closed.

7 Claims, 5 Drawing Sheets

(51) Int. Cl.
    *B29C 65/00*      (2006.01)
    *E04D 5/06*       (2006.01)
    *B29K 701/12*     (2006.01)
    *B29L 31/10*      (2006.01)

(52) U.S. Cl.
    CPC ........... *B29L 2031/108* (2013.01); *E04D 5/06* (2013.01); *Y10T 156/1715* (2015.01); *Y10T 156/1788* (2015.01)

(56) References Cited

U.S. PATENT DOCUMENTS

| | | |
|---|---|---|
| 2002/0074088 A1 | 6/2002 | Pfotenhauer et al. |
| 2004/0011472 A1 | 1/2004 | Zurmuhle et al. |
| 2017/0113404 A1 | 4/2017 | Ralston |
| 2017/0254090 A1 | 9/2017 | Allor et al. |

ROOFING THERMAL WELDER EXTENSION MARKING TOOL

RELATED APPLICATION

The present application claims priority to U.S. Provisional Patent Application 62/803,177, filed Feb. 8, 2019, of same title, the entire disclosure of which is incorporated herein by reference in its entirety for all purposes.

TECHNICAL FIELD

The present invention relates to thermoplastic welding systems that weld building roofing membranes together.

BACKGROUND OF THE INVENTION

Thermoplastic roofing membranes are heat welded to create a watertight seal between the atmosphere and the building roof system beneath. A weld happens when the two sheets of thermoplastic membrane are heated to melt and then pressure placed to seal together.

Specifically, a robot thermoplastic welding machine is guided by an operator across the building roof. As it moves, it applies heat and pressure to the membranes as it rolls in a straight line along the edges of the overlapping membranes. As a result, this seals the edges of the membranes together.

Unfortunately, when the seams in a thermoplastic roofing section cross or end at the edge of the roof, the welder has to stop and cannot seal the two cross sections together. As a result, the operators/installers must go back and hand weld the open seams where the thermal welding machine could not. Unfortunately, it can be very difficult to locate the start and stop points of the weld after the welding machine has moved on. Missing these stop and start points can result in roofing leaks later on.

It would instead be desirable to clearly mark these starting and stopping points so that they could be quickly found later after the thermal welding machine has passed by. This would directly reduce the number of warranty claims associated with missed open seams where the welders started and stopped. As such, the operators could easily see the areas along the seam that have, and have not, been welded together.

SUMMARY OF THE INVENTION

The present invention provides a system that can be used to mark the locations where a thermoplastic welding machine has been performed (i.e.: the locations where welding starts and stops) when working along a seam of overlapping roofing material edges on a building roof. As such, the present marking tool can be used to easily mark the starting and stopping points of the welding during the welding process as the welding machine moves across the roof.

In operation, the present extension marking tool attaches to the thermoplastic welding machine close to the point where the welding machine melts the two roofing membrane edges together. In preferred embodiments, the extension marking tool is attached to the side of the welding machine using a clamp like mechanism. The tool then hangs down off the welding machine and a lever connects it to the handlebars (near the hand brake system) of the welding machine. In its default position, the marker is raised away from the seam by a spring. The operator then lifts a hand lever to pull a wire or cord or spring that is set up like a pulley system to drop the marker down next to the seam. A pen or marker is placed into the end of a rotating arm that faces downwardly towards the membrane. When the hand lever is activated by the operator, it will lower the arm with the pen or marker thereby leaving a mark on the membrane. As such, the operator conveniently marks the start and stop of the welded together seam. Importantly, this can be done during welding, and without having to pause the welding. As such, the operator (or another person) is able to quickly go back later and hand weld the open seam (in the area which has not been marked as having been sealed). The present invention is ideally suited for large roofs (>25,000 sq. ft) where several stop and start points typically occur along in the seams.

In preferred aspects, the present thermoplastic welding machine extension marking tool system comprises a thermal welding machine; a mounting bracket attached to a side of the thermal welding machine; a hammer arm rotatably connected to the mounting bracket, wherein a distal end of the hammer arm is shaped to receive a marker or pen therein; a cable or spring connected to the distal end of the hammer arm; and a hand lever mounted adjacent to hand controls on the thermal welding machine, wherein the hand lever is connected to the cable or spring such that motion of the hand lever raises or lowers the distal end of the hammer arm and thus raises or lowers the pen or marker against the roofing membrane.

The hammer arm is preferably balanced in the mounting bracket such that the distal end of the hammer arm falls downwardly unless pulled up by the cable or spring. As such, a method of using the present system involves: advancing a thermal welding machine across the edges of overlapping building roofing material; and intermittently pulling the lever to lower the marker or pen connected to the thermal welding machine to mark locations along a seam of the edges of overlapping building roofing material.

DETAILED DESCRIPTION OF THE DRAWINGS

Figure 1:
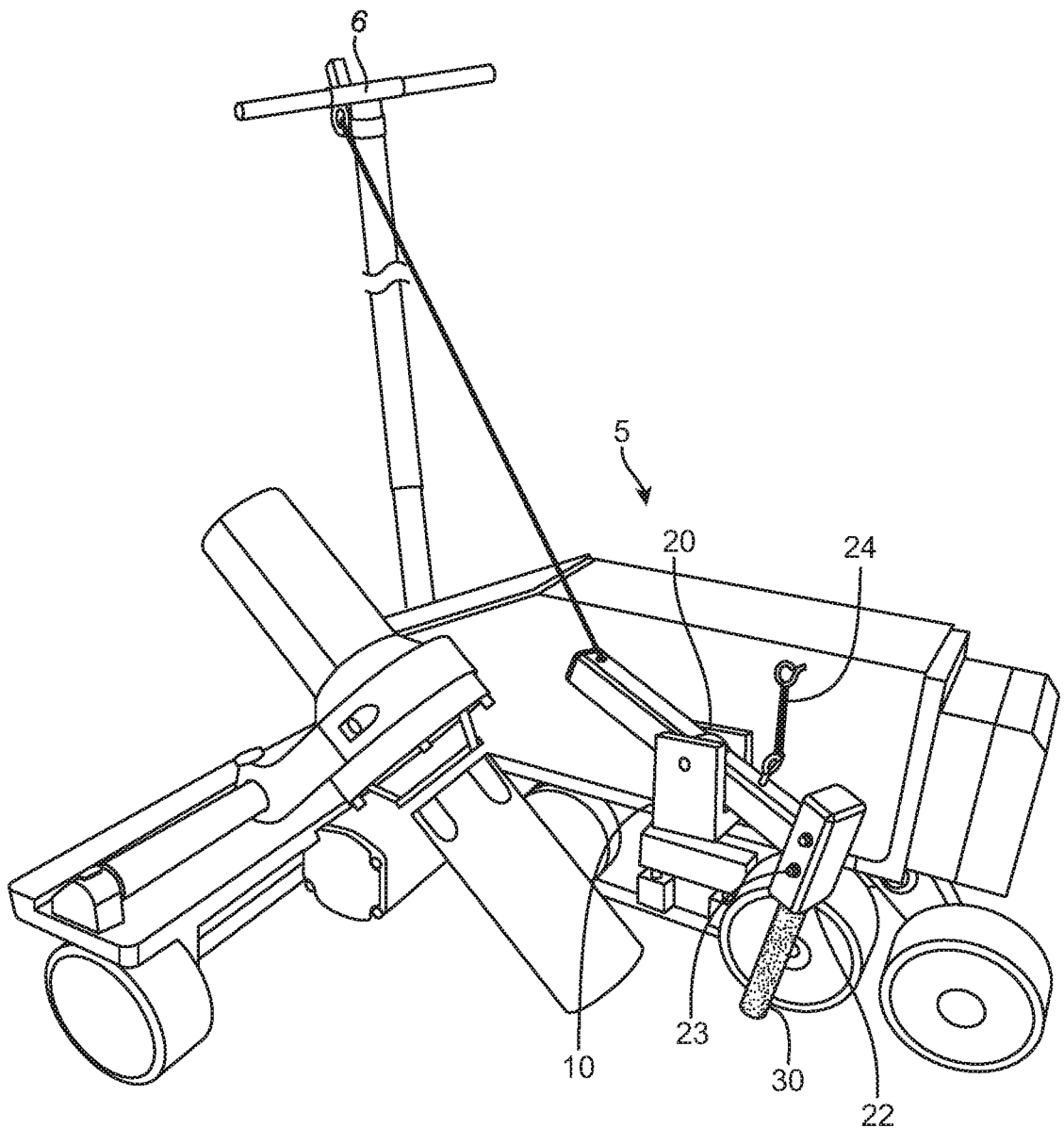
FIG. 1 is an illustration of the present thermal welding machine for welding overlapping edges of roof membranes together.

FIG. 1 is an illustration of an operator using a thermal welding machine 5 with the present extension marking system to weld the overlapping edges of roof membranes together.

Figure 2:
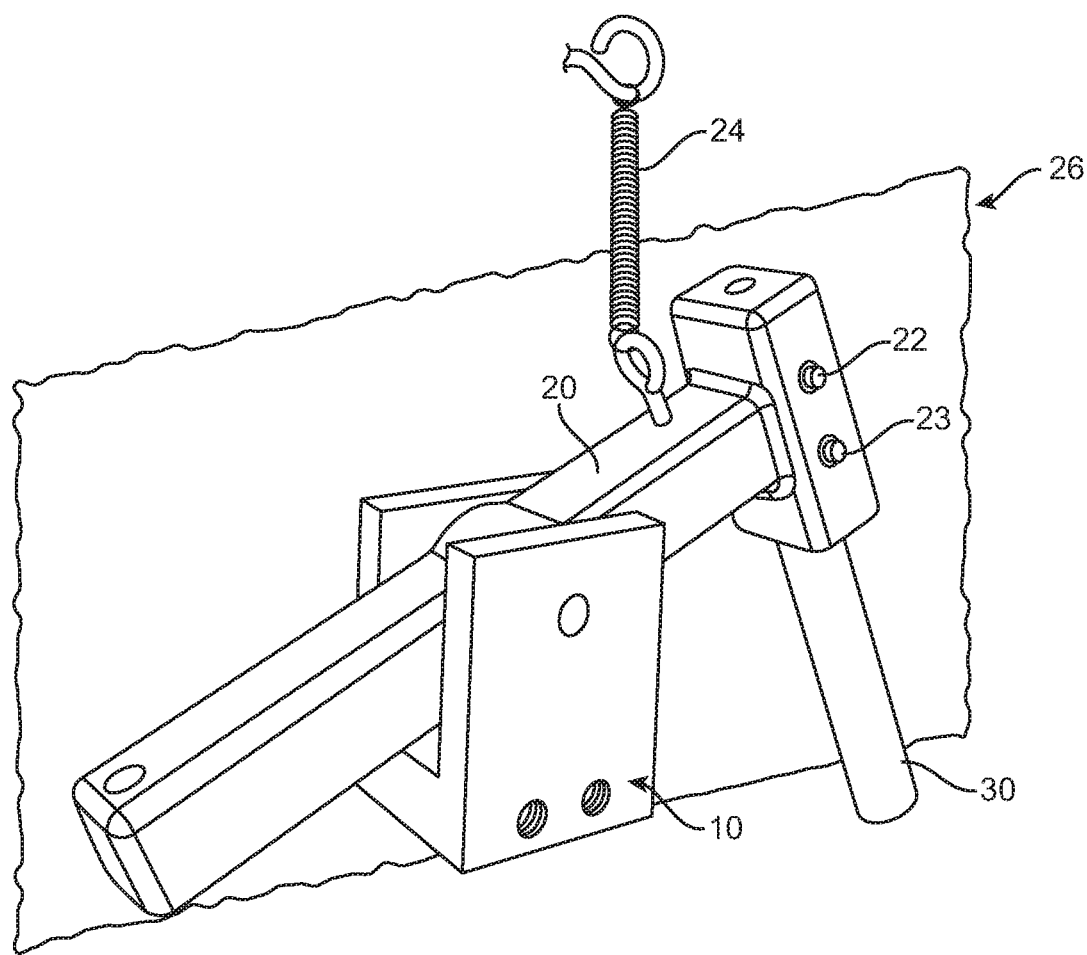
FIG. 2 is a close-up perspective view of the present thermal welder extension marking tool.
Figure 3:
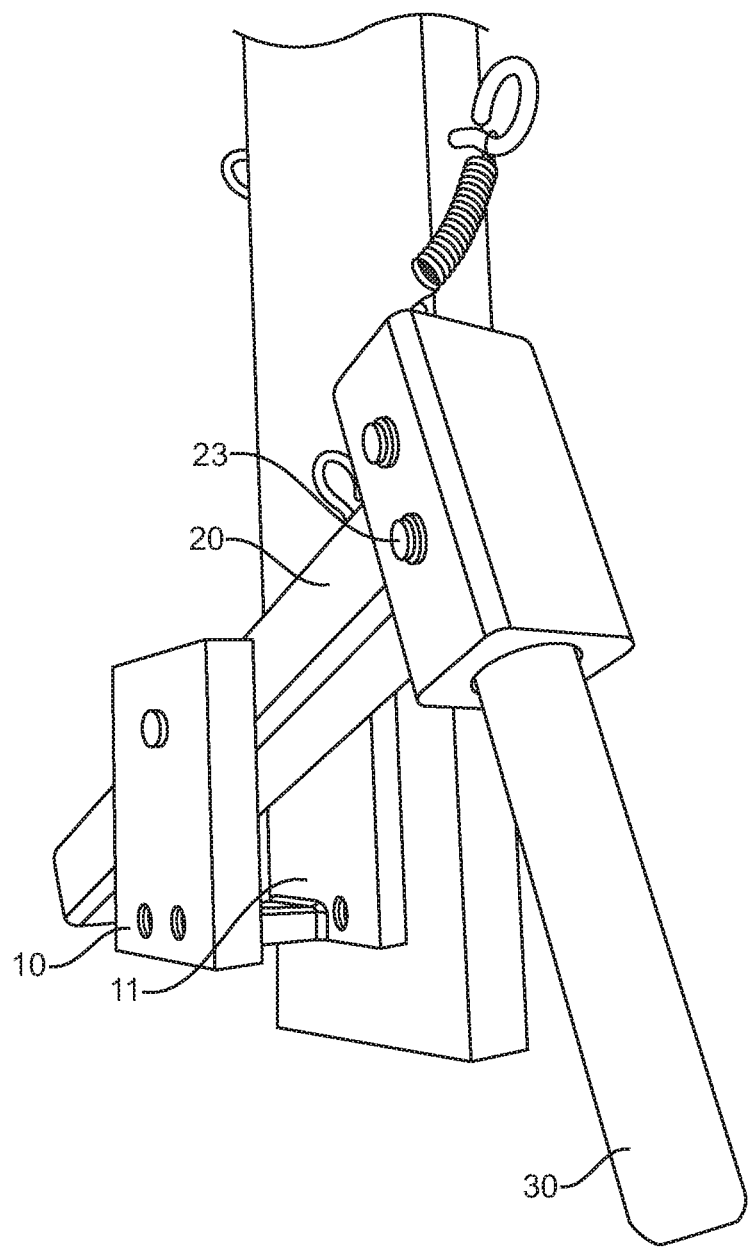
FIG. 3 is another close-up perspective view of the exemplary U-bracket and hammer-shaped pen/marker holder of the present system.

FIGS. 2 and 3 are close up views of the present thermal welder extension marking tool. In preferred embodiments, the present thermal welder extension marking tool comprises: a mounting bracket 10 and a hammer arm 20 rotatably connected to mounting bracket 10. The distal end of hammer arm 20 is shaped to receive a marker 30 therein.

Figure 4:
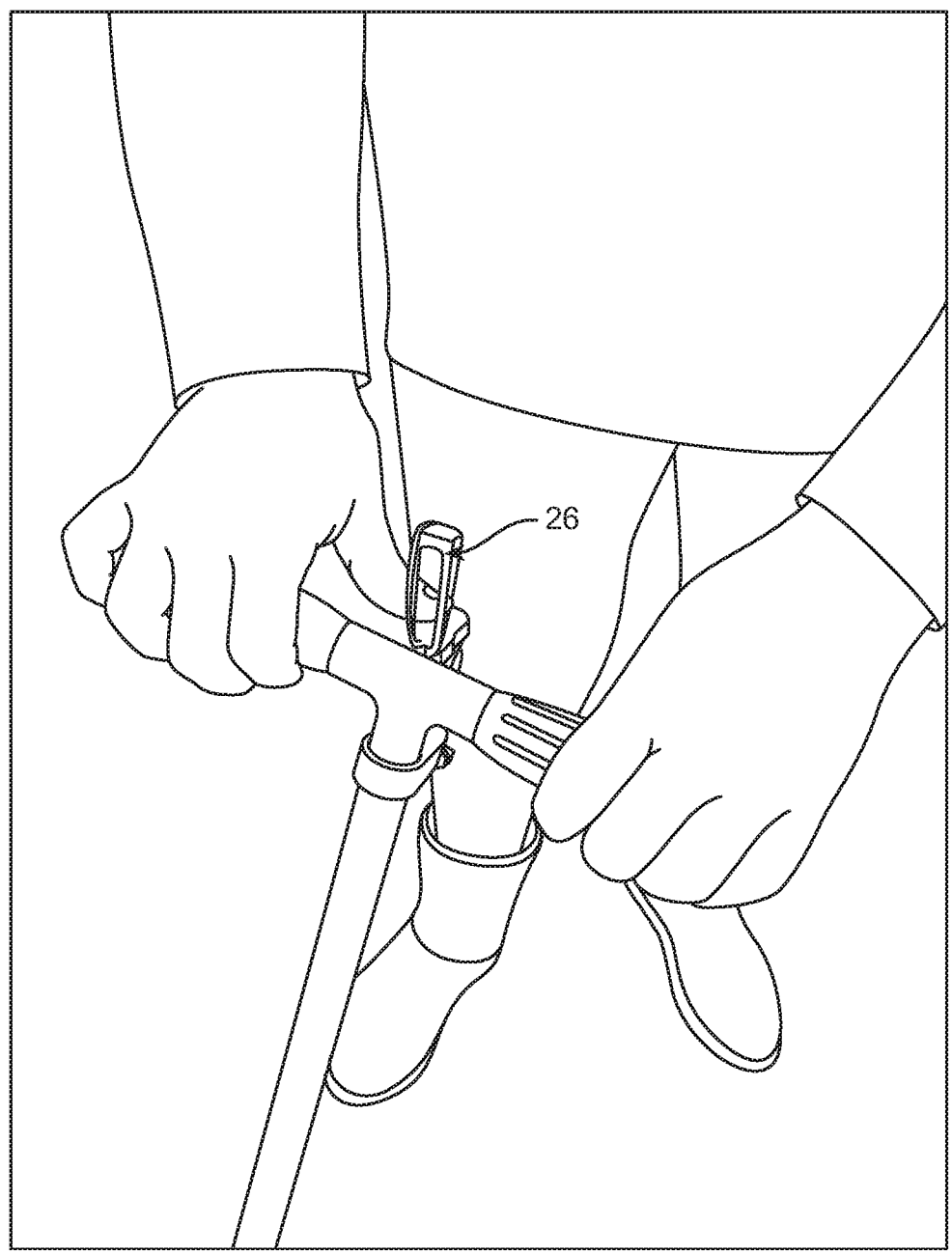
FIG. 4 is an illustration of a hand lever used by an operator to activate the marker of the present thermal welder extension marking tool.

Also included is a cable or spring 24 connected to the distal end of hammer arm 20; and a hand lever 26 (FIG. 4) is connected to the cable or spring to the opposite end of hammer arm 20 (FIG. 1). FIG. 4 shows hand lever 26 mounted on the thermal welder 5's handlebar 6.

In operation, spring 24 will naturally bias hammer arm 20 into an upward position (in which marker 30 is lifted away from the roof as seen in FIG. 2). However, when hand lever 26 is activated, it will pull on spring 24 to rotate hammer arm 20 and lower pen or marker 30 into contact with the roof (as seen in FIG. 1).

Preferably, the hammer arm 20 is balanced in mounting bracket 10 such that the distal end 22 of hammer arm 20 falls downwardly unless it is lifted up by the cable or spring. As best seen in FIG. 3, mounting bracket 10 preferably has a bottom opening notch 11 to permit a marker or pen 30 to drop downwardly into contact with the roof.

In optional preferred embodiments, the distal end of hammer arm 20 has one or more openings into which screws 22 and 23 can be received to hold the pen or marker 30 in position.

Figure 5:
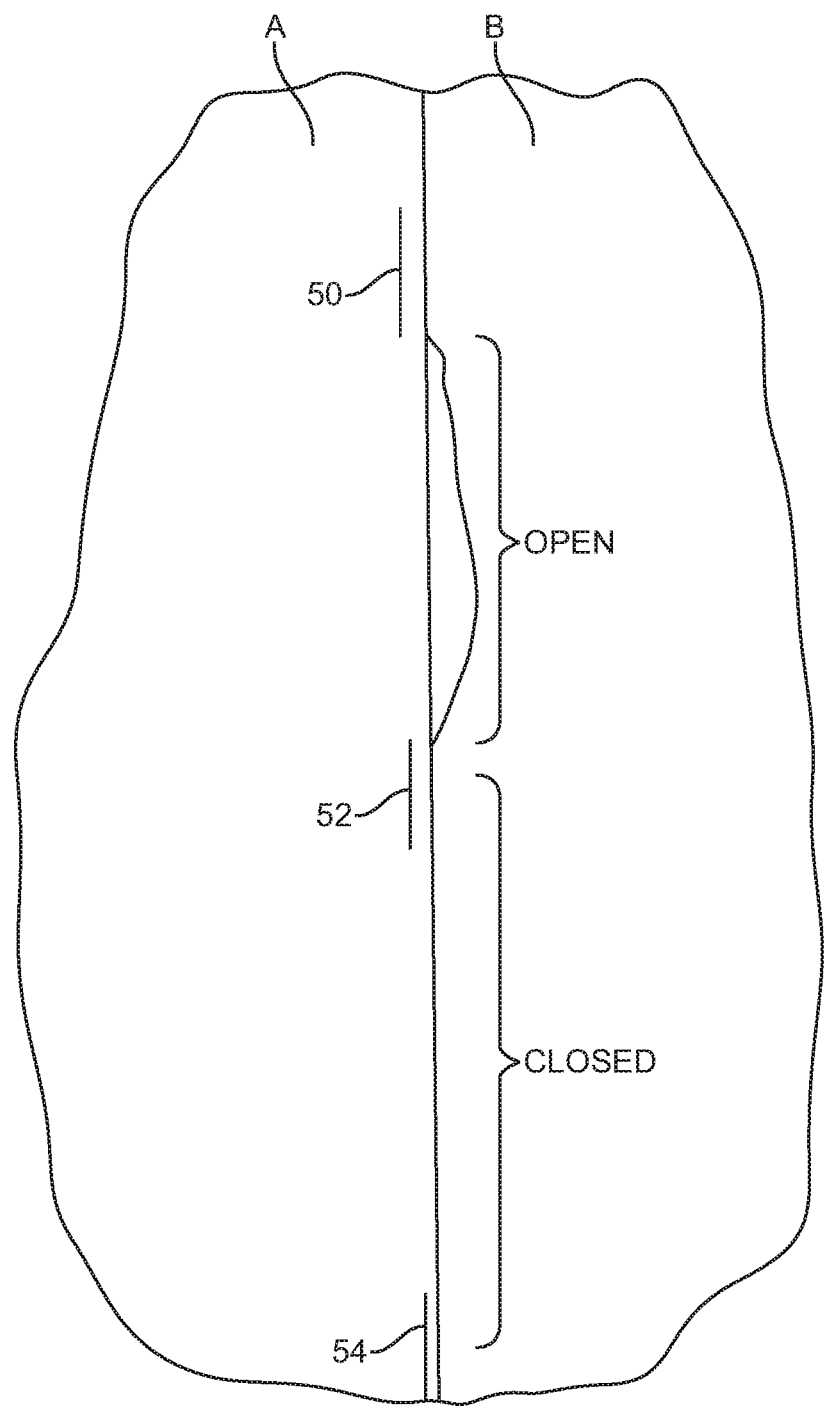
FIG. 5 is an illustration of the markings of the present system adjacent to a welding seam showing both an open region that has not been thermally welded together and a closed region that has been thermally sealed together.

In preferred aspects, the present system thereby also provides a method of using a thermal welder extension marking tool, comprising: advancing a thermal welding machine 5 across the edges of overlapping building roofing material; while intermittently lowering and raising a marker or pen 30 connected to the thermal welding machine to mark locations along a seam of the edges of overlapping building roofing material where the seam is open or closed (as seen in FIG. 5).

In preferred aspects, the step of intermittently lowering and raising the marker 30 comprises using a hand lever 26 connected to a cable or spring 24 to lower or raise marker 30.

Lastly, FIG. 5 is an illustration of a welding seam showing both a closed region that has been thermally welded together, and an open region that has not been thermally welded together. Specifically, two roofing membranes A and B are to be welded together. In this illustration, the edge of membrane B is sitting on top of the edge of membrane A. An operator advances the thermal welding machine (5 in FIG. 1) along the overlap. As the operator advances down the seam, (s)he can lift on hand lever 26 to drop marker 30 done into contact with the roof. The operator may hold down the hand lever 26 for a short period of time so that lines 50, 52, 54 are drawn onto the roof. For example, the operator may mark lines 50, 52 and 54 as "end or beginning of seal" locations. As such, the operator could either mark locations 52 and 54 as the end locations of a section of closed (i.e.: thermally welded together) seam, or mark locations 50 and 52 as the end locations of a section of open (i.e.: not thermally welded together) seam. As such, the operator can later come back and quickly find the locations of open seam regions (which can then be thermally welded together by hand). It is to be understood that the present invention is not limited to any particular marking patterns. For example, the operator can mark the roof with dots, short lines or long lines, all depending upon when the operator manually activates hand lever 26 to have marker 30 contact the roofing surface.

What is claimed is:

1. A thermal welding marking system, comprising:
   a thermal welding machine;
   a mounting bracket attached to a side of the thermal welding machine;
   a hammer arm rotatably connected to the mounting bracket, wherein a distal end of the hammer arm is shaped to hold a marker or pen thereon;
   a cable or spring connected to the hammer arm; and
   a hand lever mounted adjacent to hand controls on the thermal welding machine, wherein the hand lever is connected to the cable or spring such that motion of the hand lever raises or lowers the distal end of the hammer arm.

2. The system of claim 1, wherein the hammer arm is balanced in the mounting bracket such that the distal end of the hammer arm falls downwardly unless lifted by the cable or spring.

3. The system of claim 1, wherein the distal end of the hammer arm has an opening to permit a locking element received therein hold the pen or marker.

4. The system of claim 1, wherein the mounting bracket has a bottom opening notch to permit the marker or pen to move downwardly towards the roof.

5. A method of using a thermal welder extension marking tool, comprising:
   advancing a thermal welding machine across the edges of overlapping building roofing material; and
   intermittently lowering and raising a marker or pen connected to the thermal welding machine to mark locations along a seam of the edges of overlapping building roofing material where the seam is open or closed.

6. The method of claim 5, wherein the step of intermittently lowering and raising the marker or pen comprises using a hand lever connected to a cable or spring to lower or raise the marker or pen.

7. The method of claim 6, wherein the hand lever is mounted on handlebars of the thermal welding machine.

* * * * *